(No Model.)

G. O. STANDISH.
HORSESHOE.

No. 333,974. Patented Jan. 5, 1886.

Witnesses.
E. Planta
Andreas Blume

Inventor.
Geo. O. Standish
by J. H. Adams
Attorney.

N. PETERS, Photo-Lithographer, Washington, D. C.

United States Patent Office.

GEORGE O. STANDISH, OF BOSTON, MASSACHUSETTS.

HORSESHOE.

SPECIFICATION forming part of Letters Patent No. 333,974, dated January 5, 1886.

Application filed April 30, 1885. Serial No. 163,924. (No model.)

*To all whom it may concern:*

Be it known that I, GEORGE O. STANDISH, a citizen of the United States, residing at Boston, in the county of Suffolk and State of Massachusetts, have invented a new and useful Improvement in Horseshoes, of which the following is a specification.

The object of my invention is to provide a horseshoe which can be readily and securely attached to the foot or hoof of a horse without the use of nails as in the usual manner, it being a well-known fact that horses are very frequently seriously injured and incapacitated for use and their lives endangered by the use of nails in securing the shoe to the hoof.

The invention consists in constructing the shoe in two parts, which are hinged or pivoted together at the front portion, each half being provided with curved flanges that fit over the edges of the hoof on each side. The two parts of the shoe being pivoted together at the front admits of their being opened so as to be readily placed upon the hoof, and when the parts are closed upon the hoof they are held securely in position by means of a wedge having beveled edges and passing into corresponding grooves in the two parts of the shoe.

Figure 1:
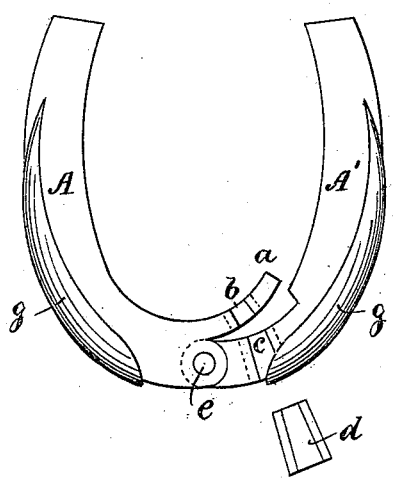
Figure 2:
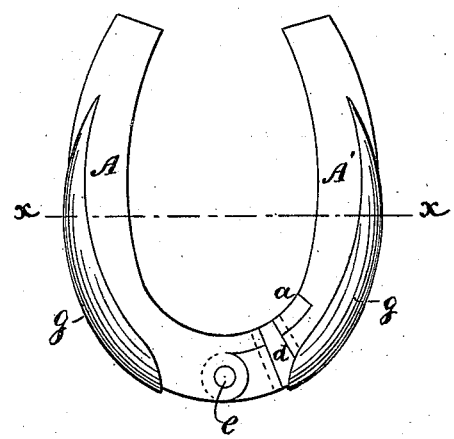
Figure 3:
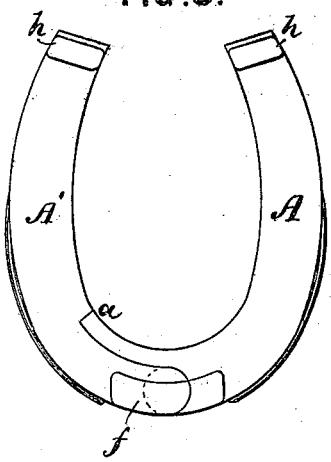
Figure 4:
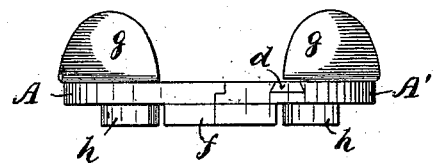
Figure 5:
Figure 6:
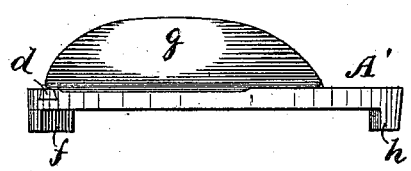

Referring to the accompanying drawings, Figure 1 is a plan or top view of the shoe, showing the two parts opened to receive the hoof. Fig. 2 is a similar view with the two parts closed as when on the hoof. Fig. 3 is a view of the under side of Fig. 2. Fig. 4 is a front view. Fig. 5 is a transverse section on the line $x\ x$ of Fig. 2, and Fig. 6 is a side elevation of the shoe.

A A' are the two portions of the shoe, and are pivoted together at $e$, so as to admit of the rear ends to be opened to be fitted to the hoof. The part A is made with a curved extension, $a$, which fits within a corresponding recess in the opposite part, A', as shown, and serves as a stop to hold the parts in place. Near the center of the front end is a recess or groove, $c$, in the part A', and also a continuation, $b$, of the same in the extension $a$ of the part A, each having receding sides, as a mortise. In these recesses is fitted a wedge, $d$, having beveled sides, and serving as a tenon, so that when driven into the said recesses the two parts will be securely locked together, as shown in Fig. 2. On the outside of each part of the shoe, and forming a part of the same, is a flange, $g\ g$. This flange extends upward a short distance, and is made to conform to the shape of the portion of the hoof which it covers, and the rear ends are bent inward somewhat over the shoe, so that when the shoe is fitted upon the hoof, and the wedge $d$ is inserted in place, the flanges $g\ g$ will act as clamps to hold the shoe upon the hoof.

$f$ represents a toe-calk, and $h\ h$ are heel-calks; but these may be omitted when desirable.

I am aware that horseshoes have been made in two parts pivoted at the toe portion. This I do not claim; but What I do claim as my invention is—

A horseshoe made in two parts, A A', pivoted together at the toe portion, the part A being provided with an extension, $a$, that fits in a corresponding recess in the part A', in combination with the wedge $d$, and the grooves $b\ c$, as and for the purpose set forth.

In testimony whereof I have signed my name to this specification in the presence of two subscribing witnesses.

GEORGE O. STANDISH.

Witnesses:
   JOS. H. ADAMS,
   E. PLANTA.